United States Patent [19]
Morisaki

[11] Patent Number: 5,778,162
[45] Date of Patent: Jul. 7, 1998

[54] IMAGE FORMING DEVICE CAPABLE OF PREVENTING LOSS OF IMAGE DATA

[75] Inventor: Hiroshi Morisaki, Aichi-ken, Japan

[73] Assignee: Brother Kogyo Kabushiki Kaisha, Nagoya, Japan

[21] Appl. No.: 617,277

[22] Filed: Mar. 18, 1996

[30] Foreign Application Priority Data

Mar. 24, 1995 [JP] Japan .................................. 7-066305

[51] Int. Cl.$^6$ ........................................................ H04N 1/32
[52] U.S. Cl. ........................ 395/113; 358/404; 358/442; 358/444; 358/468
[58] Field of Search .................... 358/400, 404, 358/434, 442, 444, 468; 395/113, 114–116; H04N 1/32

[56] References Cited

U.S. PATENT DOCUMENTS

| | | | |
|---|---|---|---|
| 5,311,327 | 5/1994 | Fukushima et al. | 358/404 |
| 5,457,544 | 10/1995 | Ochiai | 358/404 |
| 5,621,540 | 4/1997 | Terajima | 358/404 |

*Primary Examiner*—Kim Yen Vu
*Attorney, Agent, or Firm*—Oliff & Berridge, PLC

[57] ABSTRACT

An image forming device including: an image transmission device for transmitting image data; a data transmission device for transmitting computer data; a printing device for printing based on image data and computer data stored in a memory; mode setting unit for setting a first mode wherein the image transmission device receives image data from a transmission and stores the image data into the memory while the printing device is printing based on computer data; monitor unit for determining availability of the printing device during the first mode; mode switching unit for remaining in the first mode when the monitor mode determines that the printing device is unavailable before a predetermined duration of time has elapsed and for switching, when the monitor unit determines that the printing device is unavailable after the predetermined duration of time has elapsed, to a second mode wherein the image transmission unit stores image data from the transmission into the memory; and printing control unit for outputting image data stored in the memory to the printing device when the monitor unit determines that the printing device is available during the first mode and when reception of image data from the transmission has been completed during the second mode.

16 Claims, 10 Drawing Sheets

IMAGE FORMING DEVICE CAPABLE OF PREVENTING LOSS OF IMAGE DATA

BACKGROUND OF THE INVENTION

1. Field of the Invention

The present invention relates to an image forming device with a plurality of functions such as a facsimile function, a copy function, and a printer function.

2. Description of the Related Art

There has been known a conventional image forming device with a plurality of functions such as a facsimile function wherein the device operates as a facsimile machine; a copy function wherein the device operates as a copy machine; and a printer function wherein the device operates as a printer for printing data outputted from a computer.

The device is provided with a printer priority mode wherein the device gives priority to the printer function. That is, when set to the printer priority mode, the device gives priority to printing data outputted from the computer.

However, while the device is in the printer priority mode, image data received by facsimile transmission can not be printed because priority is given to printing of computer data. Incoming image data is stored in a predetermined storage region provided in a memory device. After all the image data of the facsimile transmission has been received, the image data is converted into printable data and printed.

By storing incoming image data in this way, the facsimile function effectively operates even while giving priority to the printer function. As a result, the image data is printed after reception is completed even if the image data is received while printing data from the computer.

However, some facsimile transmissions may contain more image data than the capacity of the predetermined storage region. If image data received in such a facsimile transmission is stored in the predetermined storage region, the memory will fill up before all of the image data has been received. This will result in a transmission error that risks losing part of the image data.

SUMMARY OF THE INVENTION

It is an objective of the present invention to overcome this problem and to provide an image forming device capable of preventing loss of image data.

To overcome these problems, an image forming device according to the present invention includes: an image transmission device for transmitting image data to and from the image forming device and a remote device over a telephone circuit; a data transmission device for transmitting computer data to and from the image forming device and a computer over a transmission circuit; a memory for storing image data and computer data; a printing device for printing based on image data and computer data stored in the memory; mode setting means for setting a first mode wherein the image transmission device receives image data from a transmission and stores the image data into the memory while the printing device is printing based on computer data; monitor means for determining availability of the printing device during the first mode; mode switching means for remaining in the first mode when the monitor mode determines that the printing device is unavailable before a predetermined duration of time has elapsed and for switching, when the monitor means determines that the printing device is unavailable after the predetermined duration of time has elapsed, to a second mode wherein the image transmission means stores image data from the transmission into the memory; and printing control means for outputting image data stored in the memory to the printing device when the monitor means determines that the printing device is available during the first mode and when reception of image data from the transmission has been completed during the second mode.

According to another aspect of the present invention, an image forming device includes: an image transmission device for transmitting image data to and from the image forming device and a remote device over a telephone circuit; a data transmission device for transmitting computer data to and from the image forming device and a computer over a transmission circuit; conversion means for converting image data to print data; a memory for storing image data, computer data, and print data; a printing device for printing based on image data and computer data stored in the memory; mode setting means for setting a first mode wherein the image transmission device receives image data from a transmission and stores the image data and print data converted by the conversion means into the memory while the printing device is printing based on computer data; monitor means for determining availability of the printing device during the first mode; mode switching means for remaining in the first mode when the monitor mode determines that the printing device is unavailable before a predetermined duration of time has elapsed and for switching, when the monitor means determines that the printing device is unavailable after the predetermined duration of time has elapsed, to a second mode wherein the image transmission means stores image data from the transmission into the memory and wherein conversion means does not convert image data from the transmission into print data; and printing control means for outputting image data stored in the memory to the printing device when the monitor means determines that the printing device is available during the first mode and for, when reception of image data from the transmission has been completed during the second mode, causing the conversion means to convert image data stored in the memory from the transmission into print data and outputting the print data to the printing device.

According to still another apsect of the present invention, an image forming device includes a reception means for receiving image data from a remote device over a transmission circuit; a memory for storing the received image data; a printing device for printing based on the image data stored in the memory; determination means for determining whether or not the printing device is printing other image data when the image data is received; time counting means for counting time from when the determination means determines that the printing device is printing the other image data; print control means for, when the determination means determines that the printing device has completed printing the other image data before the time counting means reaches a predetermined time count, outputting to the printing device the received image data stored in the memory and for, when the determination means determines that the printing device is printing the other image data once the time counting means reaches the predetermined time count, outputting the received image data stored in the memory to the printing device after the reception means completes reception of all image data from the remote device.

BRIEF DESCRIPTION OF THE DRAWINGS

The above and other objects, features and advantages of the invention will become more apparent from reading the following description of the preferred embodiment taken in connection with the accompanying drawings in which:

FIG. 4 (B) is a schematic view showing the RAM of the image forming device during an image data mode;

DETAILED DESCRIPTION OF THE PREFERRED EMBODIMENTS

Figure 1:
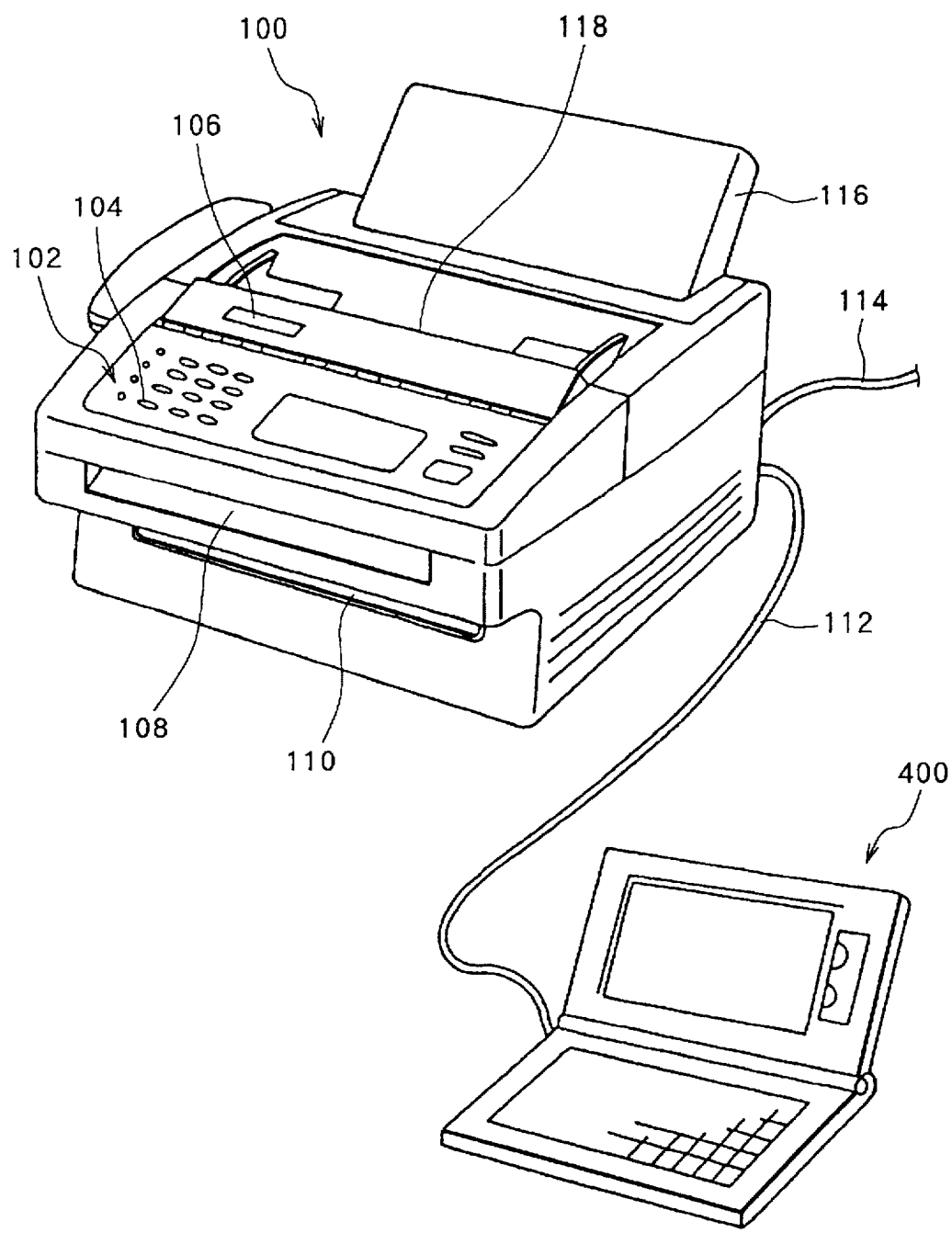
FIG. 1 is a perspective view showing an image forming device according to the present invention connected to a personal computer.

An image forming device according to a preferred embodiment of the present invention will be described while referring to the accompanying drawings wherein like parts and components are designated by the same reference numerals to avoid duplicating description.

The device of the present embodiment switches between two storage modes: a image data mode and a printable data mode. In the image data mode, only image data received in compressed form from a remote image transmitting device, such as a facsimile machine, is stored in a memory such as a RAM. In the printable data mode, both the image data and printable data, which is image data decoded by a decoding unit into a form a printer can print, is stored in the memory.

Figure 2:
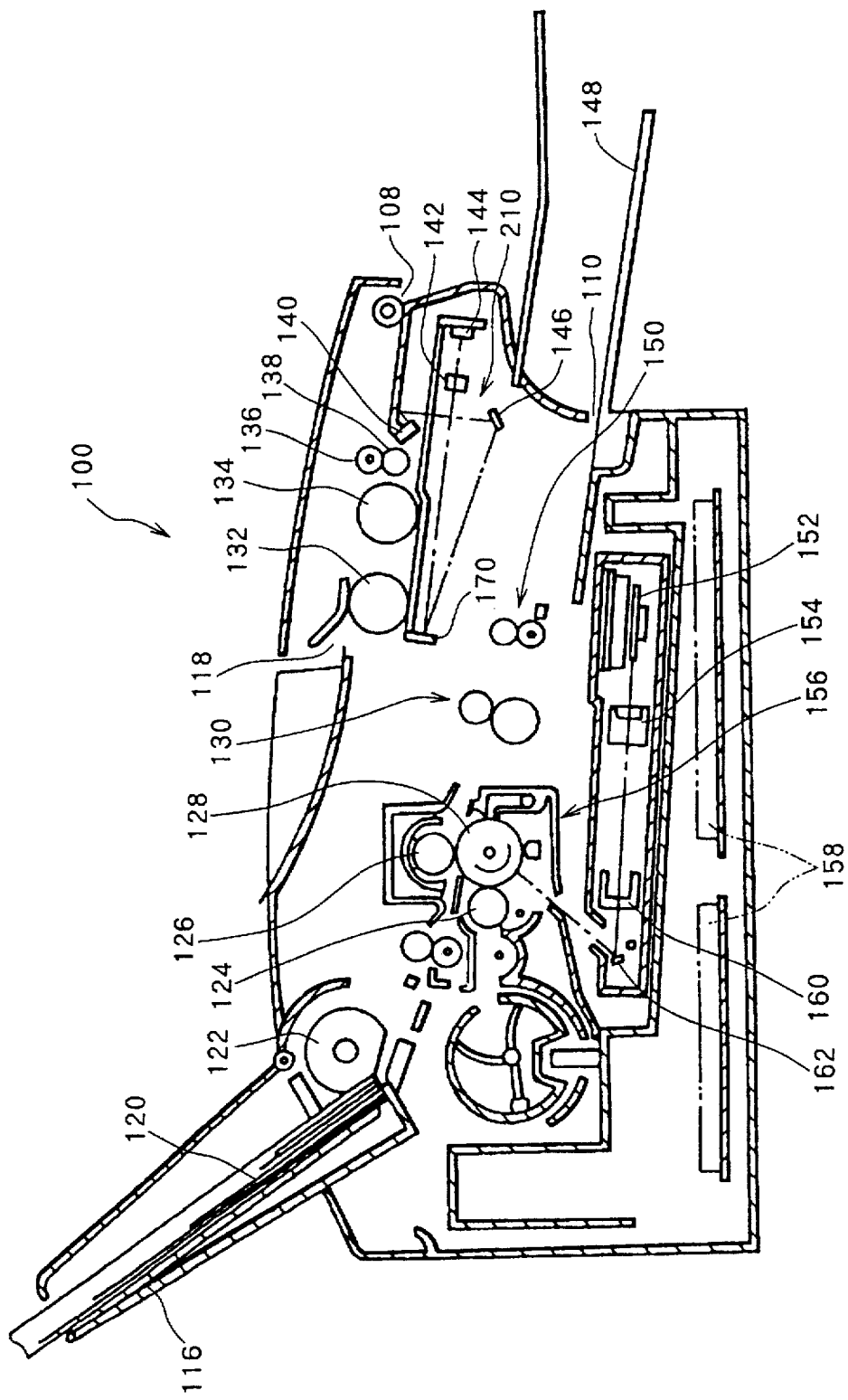
FIG. 2 is a cross-sectional view showing the image forming device.

The configuration of an image forming device 100 according to the present invention will be described in brief while referring to FIGS. 1 and 2. The image forming device 100 is provided with a facsimile function, a copy function, and a printer function. A telephone circuit 114 for the facsimile function and a transmission circuit 112 for the printer function are connected to the image forming device 100. The telephone circuit 114 is a circuit for transmitting image data between the image forming device 100 and a remote device. Similarly, the transmission circuit 112 is a circuit for transmitting computer data, such as text data, control data, and image data, between the image forming device 100 and a personal computer 400.

An operation panel 102 is provided on the upper surface of the image forming device 100. The operation panel 102 is provided with a plurality of operation buttons 104 and a display 106. The buttons 104 include buttons for inputting a variety of commands such as a priority button for setting printing priority to printing data from the computer 400 and buttons for resetting the entire image forming device 100. The display 106 is, for example, a liquid crystal display (LCD) and is used for displaying a variety of information such as information on present settings and on the operation condition of the image forming device 100.

A document insertion slot 118 is provided to the upper surface of the image forming device 100. Rollers 132, 134, 136, and 138 for transporting documents inserted into the document insertion slot 118 are provided internally from the document insertion slot 118. An image retrieval unit 210, such as a scanner, is provided along the transport path taken by documents transported by the rollers 132, 134, 136, and 138. The image retrieval unit 210 includes a light emitter 140, mirrors 146, 170, a lens 142, and a light receptor 144. The light receptor 144 includes a plurality of charge coupled devices (CCD; not shown) aligned in a band. A document discharge slot 108 from which documents are discharged after passing through the image retrieval unit 210 is provided adjacent to the image retrieval unit 210.

A document to be copied or to be facsimile transmitted is inserted into the document insertion slot 118. The document inserted into the document insertion slot 118 is transported by rollers 132, 134, 136, and 138 past the image retrieval unit 210, which then optically retrieves the image of the document in the following manner. The light emitter 140 projects light on the document. The light reflected from the document falls incident on the mirrors 146, 170, where it is reflected toward the lens 142. The light is condensed as it passes through the lens 142. The condensed reflected light is received by the light receptor 144. The CCDs of the receptor 144 receive the reflected light and output an electric signal according to the intensity of the received light. The electric signal is stored as image data in a memory such as a RAM 222 provided on the circuit board 158. Data retrieved by the image retrieval unit 210 and stored in the RAM 222 is either encoded and transmitted to a remote unit using the facsimile function or, as will be described below, printed out using the copy function. The document is then discharged from a document discharge slot 108.

A sheet supply tray 116 filled with sheets 120 is provided to the rear side of the image forming device 100. A roller 122 for separating one sheet 120 at a time from the stack in the sheet supply tray 116 and transporting the sheets 120 along a sheet feed path is disposed in the image forming device 100 adjacent to the sheet supply tray 116. A laser printer 156, which is a page printer, is provided adjacent to the roller 122 along the sheet feed path. The laser printer 156 is a includes a laser generator (not shown in the drawings), a rotatable polygon mirror 152, lenses 154, 160, a mirror 162, a photosensitive drum 128, a developing sleeve 124, a transposing roller 126, and heat pressing rollers 130. Feed rollers 150 for transporting sheets 120 printed on by the laser printer 156 out of a discharge slot 110 onto a discharge tray 148 are disposed adjacent to the laser printer 156 along the sheet feed path.

The roller 122 separates one sheet 120 at a time from the stack in the sheet supply tray 116 and transports them along the sheet feed path toward the laser printer 156. The laser generator emits a laser beam based on printable data, including text and images by a laser type scanner, or on computer data. The polygon mirror 152 is rotated at a high speed to reflect the laser beam toward the lenses 154, 160. The laser beam is transmitted through the lenses 154, 160 and is reflected off the mirror 162 to the photosensitive drum 128.

When the laser beam falls incident on the photosensitive drum 128, a latent static image having a positive charge develops on the surface of the photosensitive drum 128. Negatively charged toner from the developing sleeve 124 clings to the latent static image. The sheet 120 is transported by the roller 122 to the photosensitive drum 128. The toner clinging to the latent static image is transposed by the transposing roller 126 onto the sheet 120. The heat pressing roller 130 heats and fixes the toner to the sheet 120. Afterward, the sheet 120 is transported by the feed roller 150 out the discharge slot 110 onto the discharge tray 148.

The encoded image data stored in the RAM 222 is processed differently by different functions of the image forming device 100. The facsimile function transmits the image data as is to a remote facsimile machine and the like via a modem 212. The copy function converts image data into printable data based on which an image is formed on a sheet 120.

On the other hand, the printer function forms, in the same manner as the copy function, an image on the sheet 120 based on computer data outputted from the personal computer 400. The copy function and the printer function form images using the laser printer 156 based on respective data.

Figure 3:
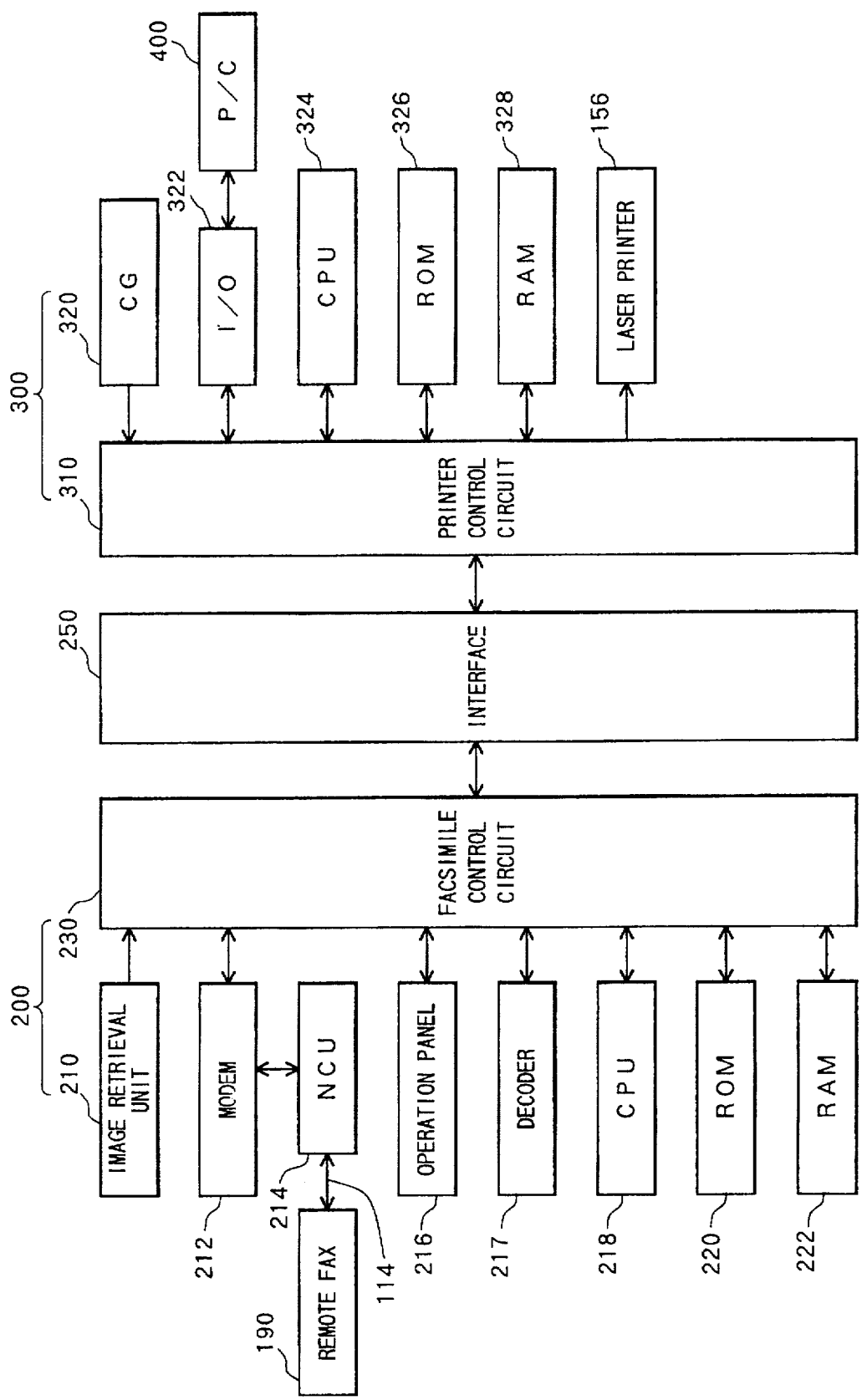
FIG. 3 is a block diagram showing hardware components of the image forming device.

FIG. 3 shows hardware of the image forming device 100. The image forming device 100 can be largely divided into a facsimile portion 200 and a printer portion 300. Transmission of signals and data between the facsimile portion 200 and the printer portion 300 is made possible by an interface 250. The facsimile portion 200 includes components for performing the facsimile function such as a facsimile control circuit 230, the image retrieval unit 210, the modem 212, a network control unit (NCU) 214, an operation panel 216, a decoder 217, a CPU 218, a ROM 220, and a RAM 222.

The printer portion 300 is provided with components for performing the printer function such as a printer control circuit 310, a character generator circuit 320, an input-output circuit (I/O) 322, a CPU 324, a ROM 326, a RAM 328, and the laser printer 156. It should be noted that the copy function and the facsimile function are performed by using both the facsimile portion 200 and the printer portion 300.

Next, an explanation will be provided for functions of essential components in the facsimile portion 200. The facsimile control circuit 230 controls components for performing the facsimile function, such as the roller 132 shown in FIG. 2. The modem 212 is for performing transmission and reception of image data between the facsimile portion 200 and a remote facsimile 190 via a network including the NCU 214 and the telephone circuit 114. The NCU 214 is a device for performing operations such as dialing a telephone network or answering a ringing signal from a telephone network.

The CPU 218 controls overall operations of the facsimile portion 200 according to facsimile control programs stored in the ROM 220. In the present embodiment an EPROM is used as the ROM 220 to lower costs. However, an EEPROM, a flash RAM, or other suitable memory could be used instead of the ROM 220. In the present embodiment a DRAM is used as the RAM 222 to allow rapid access. However, an SRAM, a flash RAM, or other non-volatile memory could be used instead of a DRAM. In the RAM 222 is stored a storage mode flag, a printer-for-FAX flag, a printer-in-use flag, a priority flag, a second counter, a reception page number counter, various types of data such as image data and computer data, or input and output data.

Next, an explanation will be provided for the function of essential components in the printer portion 300. The printer control circuit 310 controls components for performing the printer function such as the laser printer 156 shown in FIG. 2. The character generator circuit 320 converts the content of computer data transmitted from the personal computer 400 into data for printing. For example, when a character code included in computer data is for the letter "A" then the image for the letter "A" is converted into bit image data that can be formed on the sheet 120.

The input-output circuit 322 performs transmission and reception of computer data between the printer portion 300 and personal computer 400 via the transmission circuit 112.

The CPU 324 controls overall operations of the printer portion 300 according to a printer process program stored in the ROM 326.

In the present embodiment an EPROM is used as the ROM 326 in the same manner as for the ROM 220. However, an EEPROM, a flash RAM, or other suitable memory could be used instead of the ROM 326. In the present embodiment a DRAM is used as the RAM 328 in the same manner as for the RAM 222. However, an SRAM, a flash RAM, or other non-volatile memory could be used instead of a DRAM. In the RAM 328 is stored various types of data such as computer data, printable data, input data, and output data.

Figure 4:
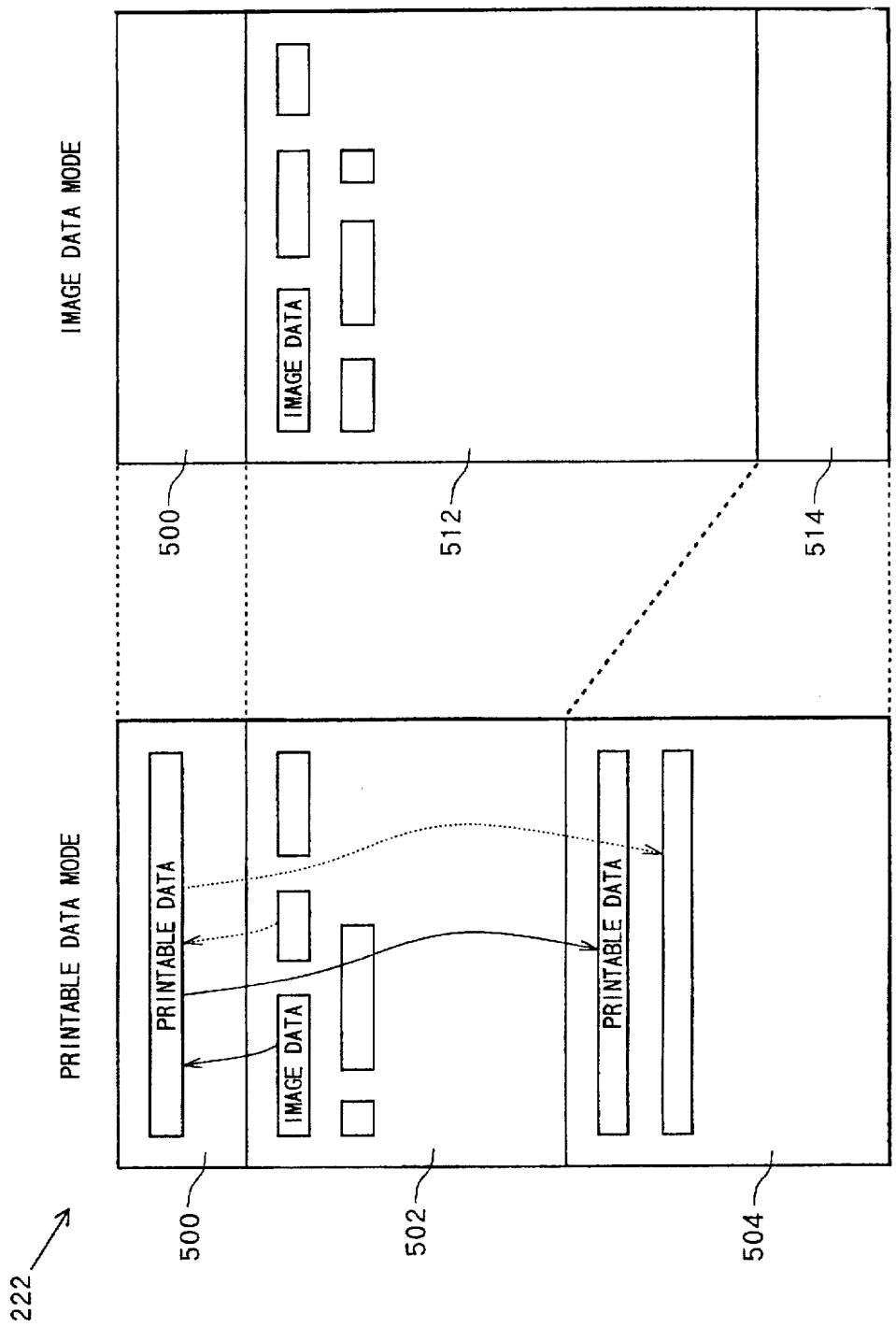
FIG. 4 (A) is a schematic view showing a RAM of the image forming device during a printable data mode.

FIG. 4 (A) schematically shows status of the RAM 222 during the printable data mode and FIG. 4 (B) shows status of the RAM 222 during the image data mode. In both storage modes, the RAM 222 secures various memory regions including a work region 500 for temporarily storing data, a transmission/reception buffer region for storing encoded image data from incoming facsimile transmissions, and a recording buffer region for storing printable data converted from image data of the transmission/reception buffer region.

To enable high-grade printing during the printable data mode, more recording buffer region is secured in the printable data mode than in the image data mode. That is, a recording buffer region 504 during the printable data mode is larger than a recording buffer region 514 during the image data mode. On the other hand, to enable storage of more pages of data in the image data mode, more memory is secured for a transmission/reception buffer region 512 during the image data mode than for a transmission/reception buffer region 502 in the printable data mode.

Figure 5:
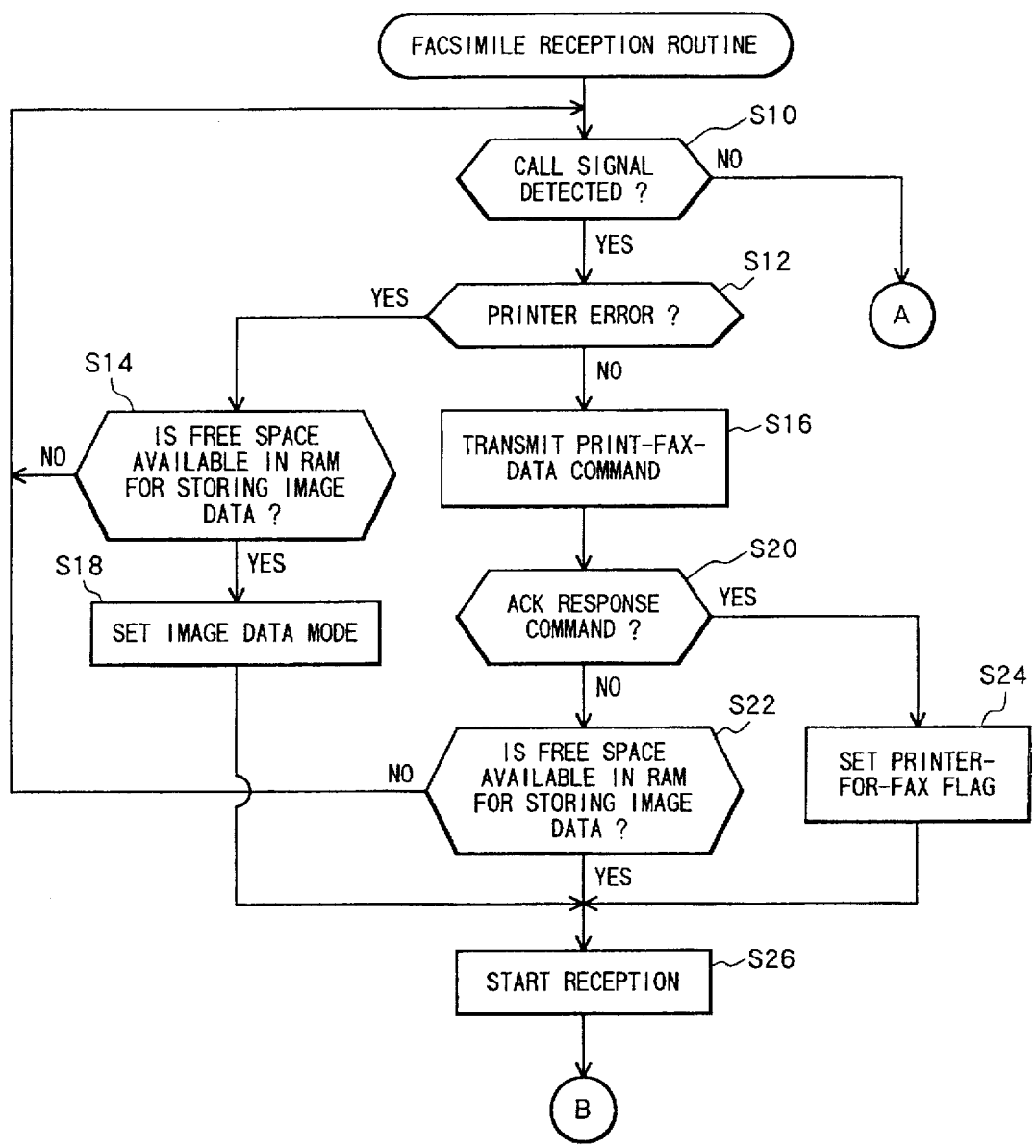
FIG. 5 is a flowchart representing a portion of a facsimile reception routine of the image data mode.
Figure 6:
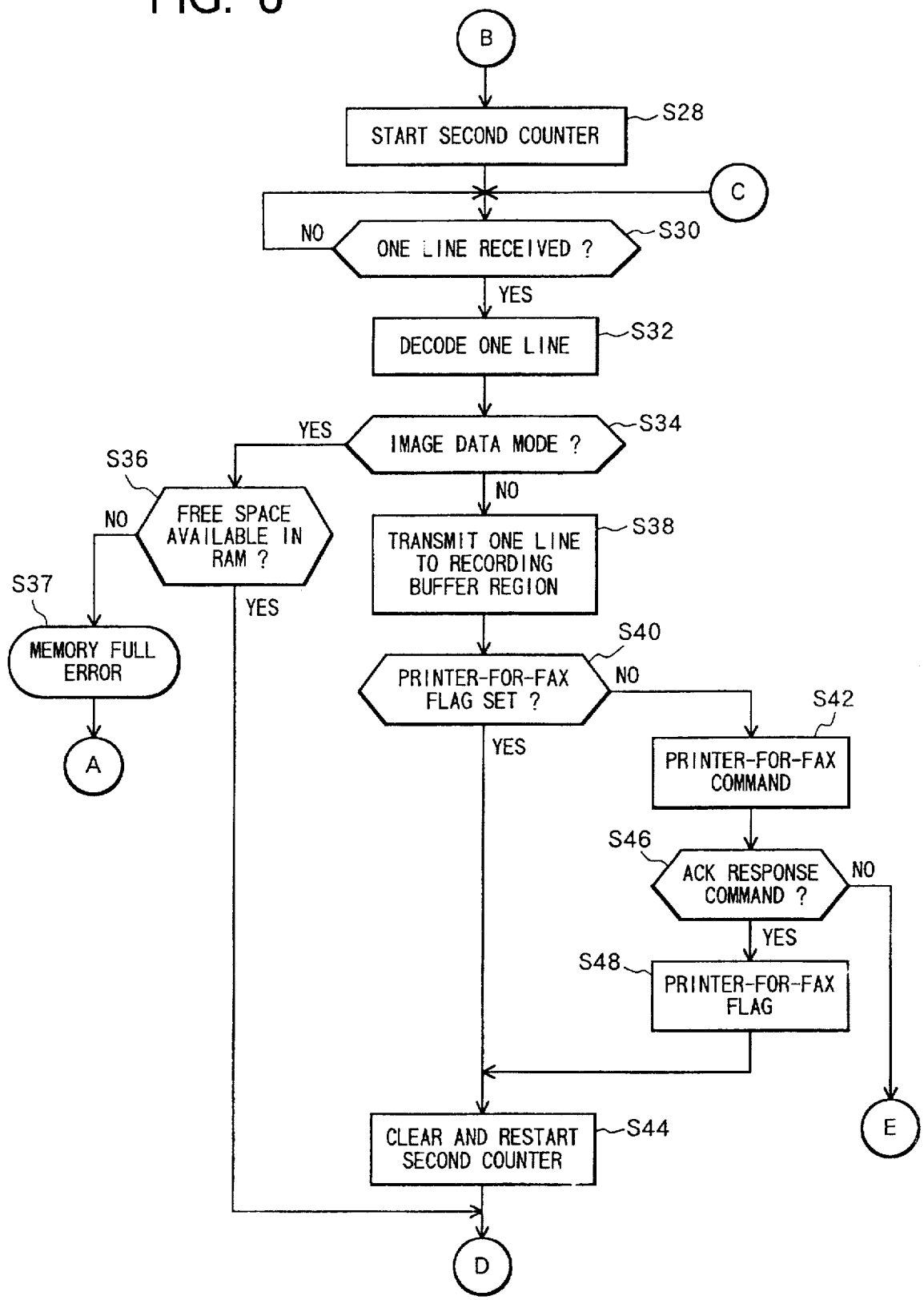
FIG. 6 is a flowchart representing a continuation of the facsimile reception routine of FIG. 5.
Figure 7:
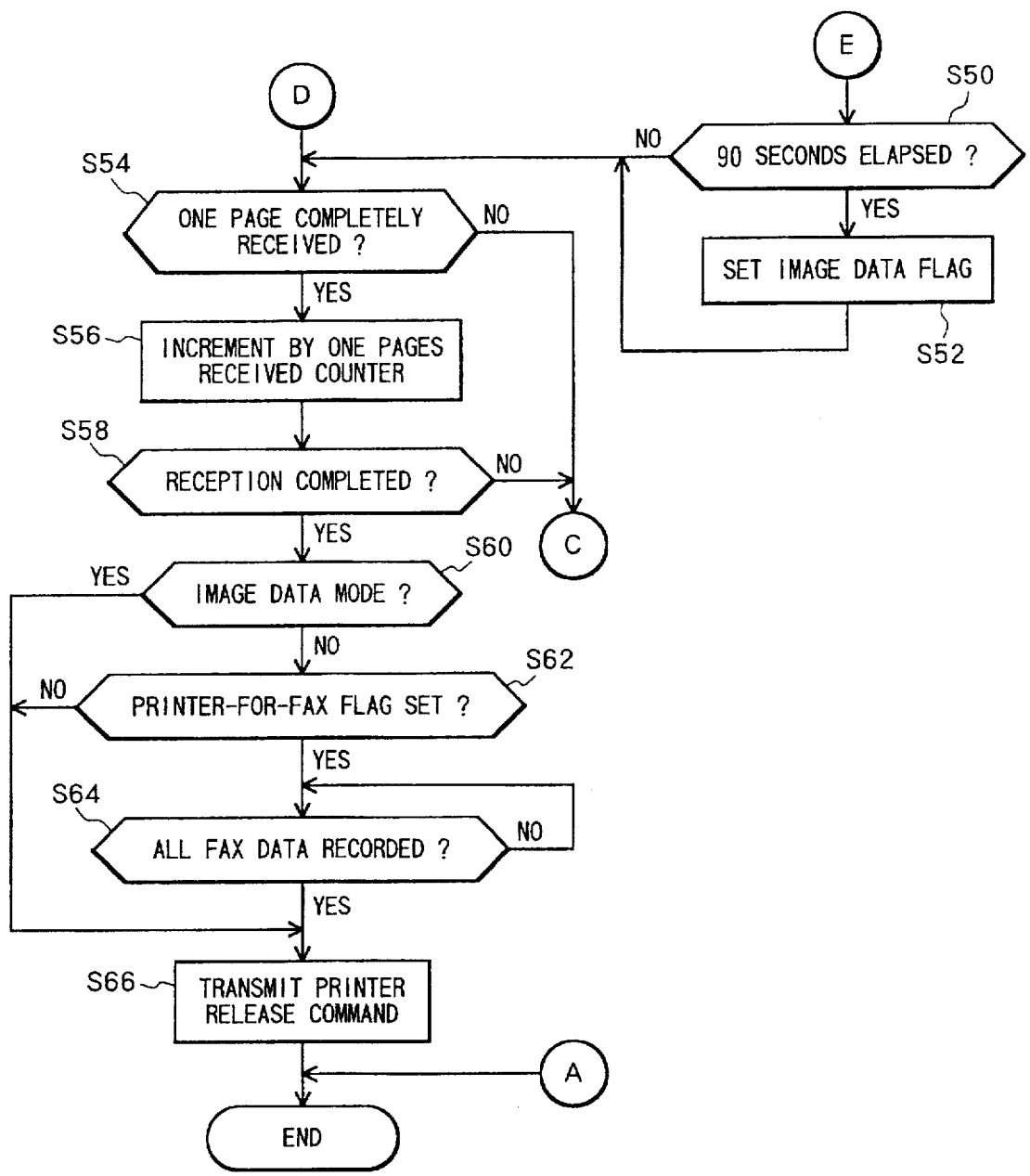
FIG. 7 is a flowchart representing a continuation of the facsimile reception routine of FIG. 5.
Figure 8:
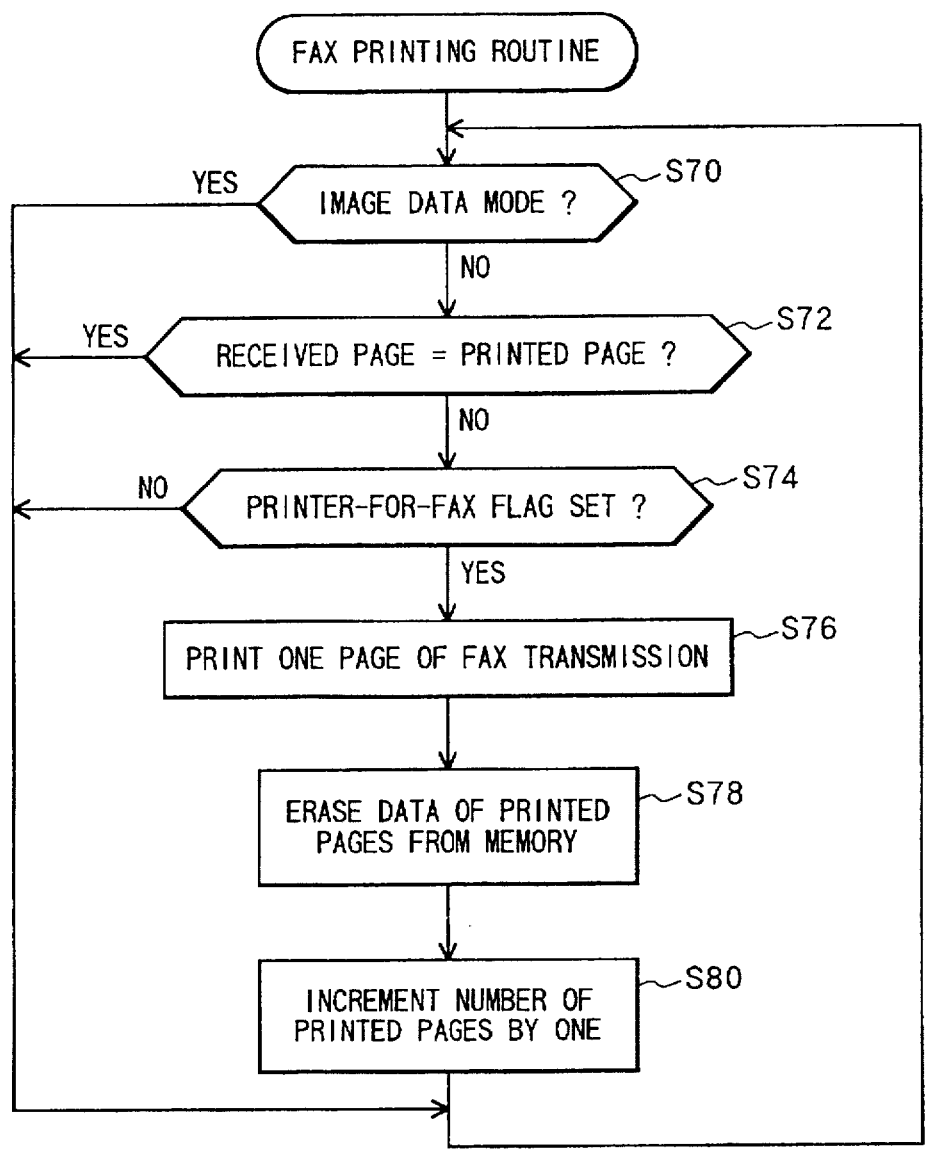
FIG. 8 is a flowchart representing a FAX printing routine of the image forming device.
Figure 9:
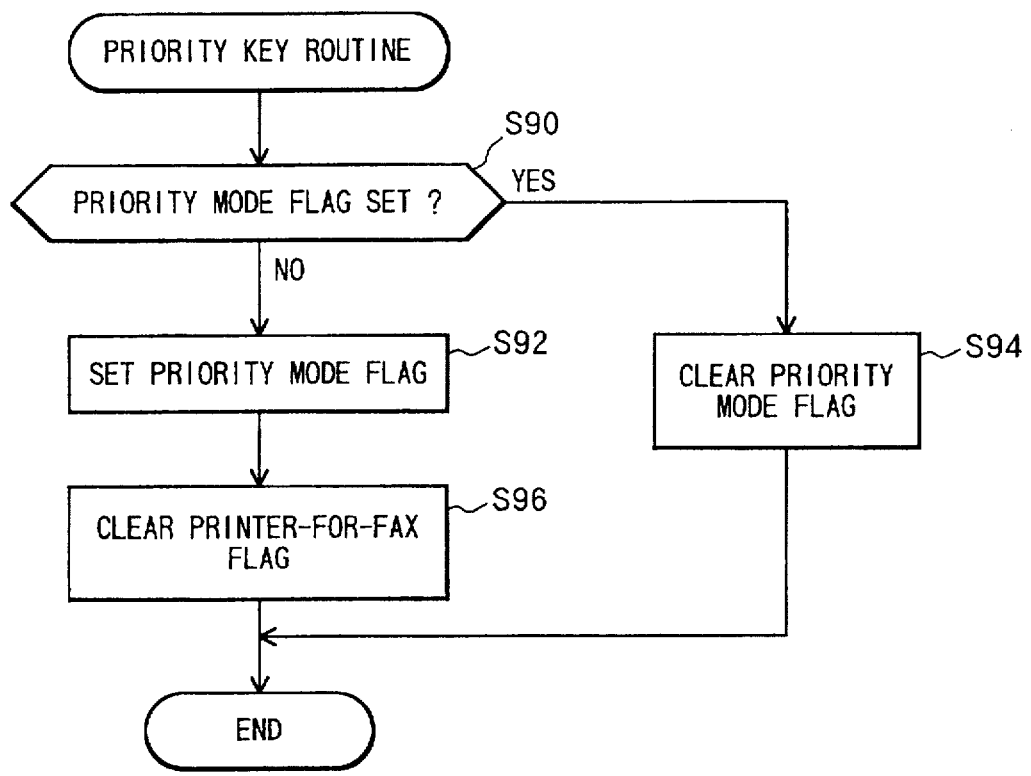
FIG. 9 is a flowchart representing a priority key routine of the image forming device.
Figure 10:
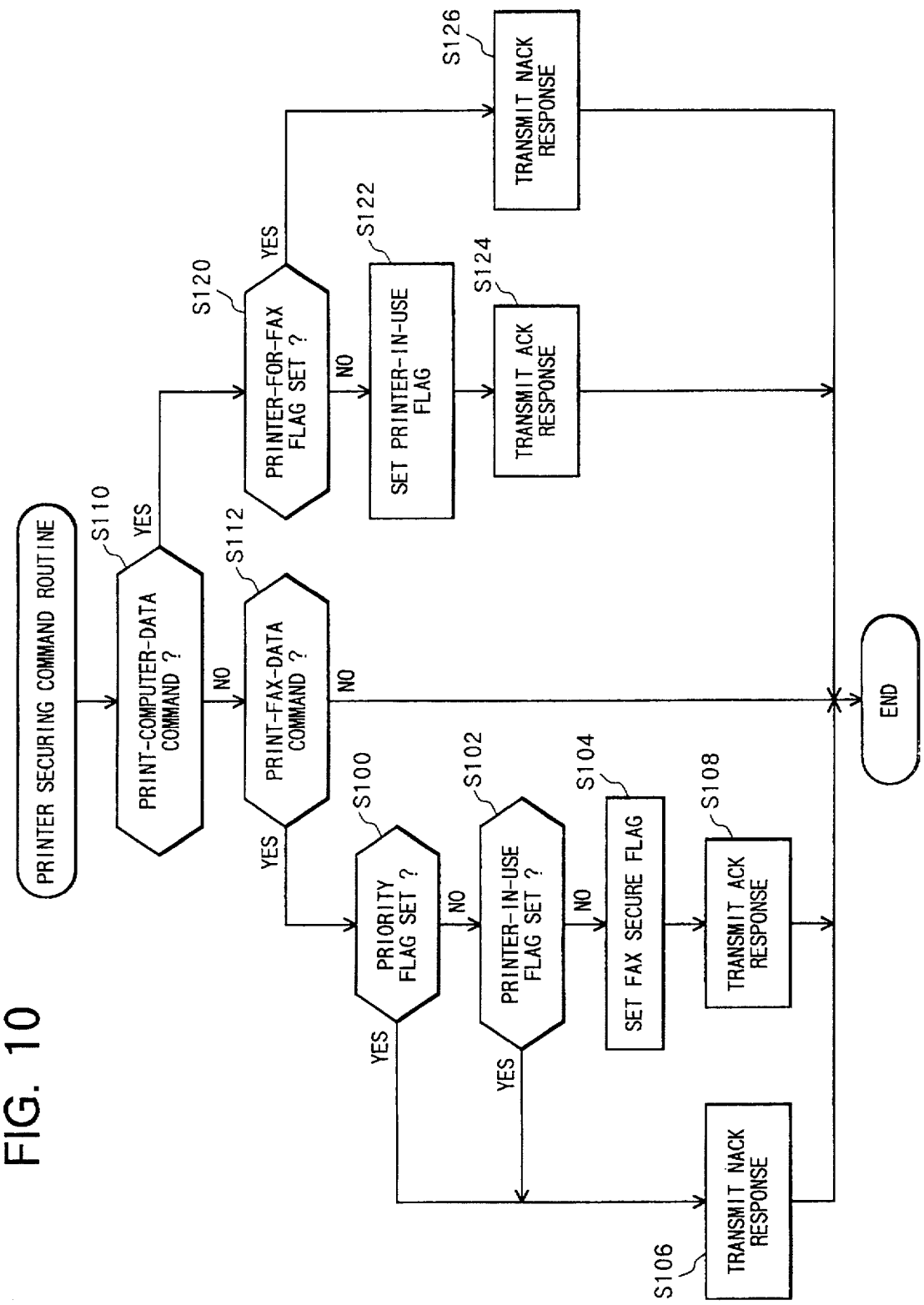
FIG. 10 is a flowchart representing a printer securing command routine of the image forming device.

Procedures performed in the image forming device 100 will be described while referring to FIGS. 4 through 10. FIGS. 5 through 7 are flowcharts representing a series of processes performed by the CPU 218 when executing a facsimile reception routine stored in the ROM 220. FIG. 8 shows a FAX printing routine and FIG. 9 shows a priority key routine. FIG. 10 is a flowchart representing processes performed by the CPU 324 when executing a printer securing command routine stored in the ROM 326. The FAX printing routine of FIG. 8, the priority key routine of FIG. 9, and the printer securing command routine of FIG. 10 are independent processes performed in parallel with and in a time shared condition with the facsimile reception routine of FIGS. 5 through 7.

First, the operation of the facsimile portion 200 will be explained while referring to FIG. 4 through 7. It should be noted that the storage mode flag stored in the RAM 222 is set to the printable data mode during initialization processes. As shown in FIG. 5, whether or not a call signal (CI signal) from the remote facsimile 190 has been received by the modem 212 is determined in S10. When no call signal is received (S10:NO), then the present process procedures are ended. When a call signal has been received (S10:YES), then whether or not the laser printer 156 can be used is determined in S12. In more concrete terms, whether or not an error condition, such as the laser printer 156 being out of paper or out of toner, exists is determined.

When the laser printer 156 can be used (S12:NO), then a print-FAX-data command is transmitted to the CPU 324 of the printer portion 300 in S16. The print-FAX-data command is one of two types of printer securing command and is for securing use of the laser printer 156 for the facsimile portion 200. The other type of printer securing command is a print-computer-data command for securing use of the laser printer 156 for printing data from the computer 400 and the like. When the printer portion 300 receives a printer securing command, that is, either a print-FAX-data command or a print-computer-data command, the printer securing command routine represented by the flowchart shown in FIG. 10 is activated in the printer portion 300. The printer portion 300 responds to a printer securing command by returning a positive response (ACK) or a negative response (NACK) depending on the present situation at the printer portion 300.

The facsimile portion 200 receives the response to its print-FAX-data command from the printer portion 300 and determines whether the response is a positive response (ACK) in S20. When the response is a negative response (NACK) (S20:NO), then whether or not free space is available in the transmission/reception buffer region 512 shown in FIG. 6 (B) is determined in S22. If so, (S22:YES), then reception operations are entered in S26. These reception operations are preparation operations for executing the facsimile function such as setting the storage mode flag to the printable data mode and transmitting signals over the circuit connection to the remote facsimile 190. On the other hand, if the response is a positive response (ACK) (S20:YES), then the printer-for-FAX flag is set in S24 to indicate that the laser printer 156 is secured for use by the facsimile portion 200. Then, the transmission operations are started in S26.

It should be noted that if the laser printer 156 is in an error condition so that so that S12 results in a positive determination (S12:YES), then whether or not free space exists in the transmission/reception buffer region 502 is determined in S14 in the same manner as in S22. If so (S14:YES), then the storage mode flag stored in the RAM 222 is set to the image data mode in S18. Then the transmission operations are entered in S26.

On the other hand, if no free space remains in the transmission/reception buffer region 502 so that either S14 or S22 results in a negative determination, then insufficient memory is free to store image data from an incoming facsimile transmission. Therefore, the storage mode can not be set to the image data mode so the program returns to S10. If this condition continues for longer than a predetermined period of time, then the remote facsimile 190 will determine that the image forming device 100 is busy and so will terminate this attempt at transmission. In this way, the image forming device 100 prevents loss of data which might be lost if transmitted from the remote facsimile 190 when memory sufficient for storing the transmitted image data is unavailable.

As shown in FIG. 5, a 90-second count is started in S28. Then the program waits until the modem 212 receives one line's worth or image data in S30. Once received, the one line's worth of image data is stored in the transmission/reception buffer region 502 shown in FIG. 6 (A). Because this image data is in compressed form, it will be in a form that, if printed out as is, would be unreadable by user. For this reason, in S32 the image data is decoded, that is, converted in the decoder 217 into printable data, which when printed out will be in a format legible to users. The decoded printable data is stored temporarily in the work region 500.

Whether or not the storage mode flag is presently set to the image data mode is determined in S34. If not (S34:NO), then the printable data stored in the work region 500 is transmitted to the recording buffer region 504 in S38.

Further, whether or not the printer-for-FAX flag is set is determined in S40. If so (S40:YES), then second counter is reset to zero and restarted in S44.

It should be noted that when the present storage mode is the image data mode (S34:YES), then whether or not empty space exists in the image data memory region is determined in S36 in the same manner as in S22. If empty space exists (S36:YES), then the program proceeds to S54 shown in FIG. 7. On the other hand, if no empty space exists (S36:NO), then a message indicating a memory full error is displayed on the display 106 shown in FIG. 1 and the telephone circuit is disconnected in S37.

When in S40 the printer-for-FAX flag is not set (S40:NO), then a print-FAX-data command for securing use of the laser printer 156 is transmitted in S42 to the CPU 324 of the printer portion 300 in the same manner as in S16. A response is received in S46 in regards to the command transmitted in S42. When the response is a positive response (ACK) (S46:YES), then the printer-for-FAX flag is set in S48. Afterward, the program proceeds to S44, where the second count is restarted. On the other hand, if the response in S46 is a negative response (NACK) (S46:NO), then the program proceeds to S50 shown in FIG. 7.

Next, in FIG. 7, whether or not 90 seconds has elapsed is determined in S50. Only when the second counter indicates that 90 seconds has elapsed (S50:YES) will the storage mode flag be set to the image data mode in S52. Afterward, the program proceeds to S54.

The above-described operations are performed until one page's worth of image data has been received as determined in S54. That is, the process steps from S30 in FIG. 5 to S54 in FIG. 7 are repeated until one page's worth of image data is received.

When one page's worth of image data is received (S54:YES), a pages received counter, which indicates the number of page's worth of data that has been received, is incremented by one in S56 and then whether or not reception has been completed is determined in S58. If reception has not been completed (S58:NO), then the program returns to S30 and the above-described processes are executed until all pages of the incoming facsimile transmission have been received.

When reception is completed as determined in S58 (S58:YES), then whether or not the present mode is the image data mode is determined in S60. If not (S60:NO), then whether or not the printer-for-FAX flag is set is determined in S62. If the present mode is the image data mode (S60:YES) or if the printer-for-FAX flag is clear (S62:NO), then a printer release command is transmitted in S66 to the CPU 324 of the printer portion 300. The printer release command transmitted in S66 is for freeing up the printer portion 300 when it is secured for printing facsimile data from a facsimile transmission. Afterward the program is completed.

If the present mode is set to the printable data mode (S62:NO) and also printable data is being printed using the FAX recording routine represented by the flowchart in FIG. 8 (S62:YES), then the program goes into a standby loop in S64 until all of the incoming FAX data is printed. When printing is completed (S64:NO), then the printer release command is transmitted in S66. Then the program is completed.

FIG. 8 shows a facsimile recording routine performed in the facsimile portion 300 for printing image data received by facsimile transmission. During this process, first, whether or not the present mode is the image data mode is determined in S70. If so (S70:YES), no processes are performed.

On the other hand, if the present mode is the printable data mode (S70:NO), then whether or not the page presently being received matches the page being printed based on printable data from the facsimile transmission is determined in S72. If so (S72:YES), then the corresponding page is presently being printed so the program returns to S70 without performing any other process.

If the received page does not match the printed page (S72:NO), then, in the same manner as in S40, whether or not the printer-for-FAX flag is set is determined in S74. This determination is to determine whether or not a priority button, which is one of the operation buttons 104 shown in FIG. 1, has been pressed to enter the image forming device 100 into the printer priority mode.

In the printer priority mode, the laser printer 156 gives priority to printing data transmitted from the personal computer 400 via the transmission circuit 112. Next, the priority key routine performed in the printer portion 300 for setting the printer priority mode will be explained while referring to FIG. 9. First, whether or not a priority mode flag, which indicates the printer priority mode or a regular mode, is presently in the printer priority mode is determined in S90. If so (S90:YES), then the priority mode flag is reset to the normal mode in S94 and this routine is completed.

On the other hand, if the priority mode flag is presently in the normal mode (S90:NO), then the priority mode flag is set to the printer priority mode in S92 and the printer-for-FAX flag is cleared in S96. Then this process is completed. Accordingly, the priority button acts as a toggle switch by switching to the printer priority mode when pressed once and returning to the regular mode when pressed again.

Turning back to FIG. 8, when the priority button has been pressed, then the printer-for-FAX flag is clear (S74:NO), so the program returns to S70 without performing any processes.

On the other hand, when the priority button has not been pressed, then the printer-for-FAX flag will not be set (S74:YES), so that one page's worth of printable data from the incoming facsimile transmission is printed in S76. Then image data and printable data for the printed page are erased from the RAM 222 in S78. Said in more detail, image data stored in the transmission/reception buffer region 502 and printable data stored in the recording buffer region 504 for the same corresponding page are erased. Newly received image data, printable data produced by decoding the image data, and the like can be stored in these erased regions. When one page's worth of data is printed and the corresponding data is erased, the number of printed pages (recorded pages) is incremented in S80. Then the program returns to S70 and printing of the next page is performed in the same manner.

Next, a printer securing command routine of the printer portion 300 will be explained while referring to FIG. 10. First, whether or not the received command is a print-computer-data command outputted for executing the printer function is determined in S110. If not (S110:NO), then whether or not the command is a print-FAX-data command outputted for executing the facsimile function is determined in S112.

When the received command is a print-FAX-data command (S112:YES), then whether or not the priority mode flag is set to the printer priority mode is determined in S100. When the received command is not a print-FAX-data command (S112:NO), then this routine is ended.

When it is determined in S100 that the priority mode flag is set to the normal mode (S100:NO), then whether or not the printer function is secured is determined in S102 according to setting of the printer-in-use flag, which indicates whether or not the printer function of the laser printer 156 can be operated.

When the printer-in-use flag is clear (S102:NO), then the facsimile function is secured in S104. That is, the printer-for-FAX flag is set to indicate that the laser printer 156 can be operated for the facsimile function. Then, a positive response (ACK) is transmitted in S108 and this routine is ended.

On the other hand, when the printer-in-use flag is set (S102:YES), then the laser printer 156 can not be operated as a facsimile device. For this reason, a negative response (NACK) is transmitted in S106 and this routine is ended.

If the command received in S110 is a print-computer-data command (S110:YES), whether or not the printer-for-FAX flag is set is determined in S120.

When the printer-for-FAX flag is set (S120:YES), then the laser printer 156 can not be used for printing out computer data. Therefore, a negative response (NACK) is transmitted in S126 and the present routine is ended.

On the other hand, if the printer-for-FAX flag is clear, which shows that the laser printer 156 is not secured for the facsimile function (S120:NO), then the printer-in-use flag is set in S122. Then a positive response is transmitted in S124 and the present routine is ended.

Accordingly, when the modem 212 receives image data while the laser printer 156 is printing based on computer data, then both the image data and printable data, which was converted by executing the processes of S28 on the image data, will be stored in the RAM 222 because the storage mode flag will be in its initial setting of printable data mode. The storage mode flag will be switched to the image data mode in the mode switching processes of S52 only when the second counter reaches 90 seconds and upon execution of the monitoring processes of S42 and S46 it is determined by a negative response (NACK) that the laser printer 156 can not be used for print out FAX data. On the other hand, when the print control processes of S60, S62, and S70 through S76 are executed, if the laser printer 156 can be used then printing based on the printable data is started immediately in the printable data mode. However, in the image data mode printing will be started after reception of the entire image is completed. For this reason, printing of incoming image data can be started quickly according to the usage condition of the laser printer 156 and loss of image data can be prevented.

Also, when the memory erasure processes of S78 are executed after printable data has been outputted to the laser printer 156, then the RAM 222 is cleared of the corresponding printable data and image data. For this reason, the memory capacity of the RAM 222 can be increased for holding any newly received image data.

Further, when the priority setting processes of S90 through S96 are executed, then printing of computer data is given priority. For this reason, by performing the print control processes of S100, computer data can be printed without interruption from printing based on image data even if the laser printer 156 is temporarily freed up. For this reason, computer data from the personal computer 400 can be reliably printed given priority even when temporarily no computer data is transmitted from the personal computer.

While the invention has been described in detail with reference to specific embodiments thereof, it would be apparent to those skilled in the art that various changes and modifications may be made therein without departing from the spirit of the invention, the scope of which is defined by the attached claims.

For example, configuration, size, shape, material, number, disposition, and operation of various components are not limited to the present invention.

For example, the facsimile function was described for printing performed based on image data received over a telephone line. However, the present invention can be applied to printing performed based on image data received over wireless circuits such as a satellite circuit.

Also, the erasure processes performed in S78 of FIG. 8 erased from the RAM 222 printable data already outputted to the laser printer 156 and the image data already converted into printable data. However, even if only one of either printable data already outputted to the laser printer 156 or image data already converted into this printable data is erased from the RAM 222, then the memory capacity of the RAM 222 can be increased so that newly received image data can be stored.

Although priority was described in the embodiment as being set or released by operating a single button 104, priority can be set according to a control code included in computer data transmitted from the computer. On the other hand, priority set in this manner can be released by a control code for commanding release of priority included in the image data. By releasing priority in this manner, image data can be printed rapidly when urgent image data is received.

The embodiment described operations for incoming image data in compressed form. However, the operations can be performed for printable data not in compressed form. In this case, demodulation processes performed by the demodulator or 217 to demodulate image data into printable data can be omitted. Therefore, time for demodulation processes required while the device is in the printable data mode can be saved. In this way, image data can be quickly received and the reception time for image data reduced.

What is claimed is:

1. An image forming device comprising:
   an image transmission device for transmitting image data to and from the image forming device and a remote device over a telephone circuit;
   a data transmission device for transmitting computer data to and from the image forming device and a computer over a transmission circuit;
   a memory for storing the image data and the computer data;
   a printing device for printing based on the image data and the computer data stored in the memory;
   mode setting means for setting a first mode while the printing device is printing based on the computer data, wherein the image transmission device receives the image data from a transmission and stores the image data into the memory;
   monitor means for determining whether the printing device can be used to print based on the image data, the monitor means operating during the first mode;
   mode switching means for remaining in the first mode when the monitor means determines that the printing device is available before a predetermined duration of time has elapsed and for switching, when the monitor means determines that the printing device is unavailable after the predetermined duration of time has elapsed, to a second mode wherein the image transmission means stores the image data from the transmission into the memory; and
   printing control means for outputting the image data stored in the memory to the printing device when the monitor means determines that the printing device is available during the first mode and when reception of the image data from the transmission has been completed during the second mode.

2. An image forming device as claimed in claim 1 further comprising priority setting means for giving priority to printing of the computer data so that the print control means remains available for printing based on the computer data without printing based on the image data regardless of whether the monitor means determines that the printing device is available.

3. An image forming device as claimed in claim 1 further comprising a conversion means for converting the computer data, received from the computer over the transmission circuit and stored in the memory, into the image data which is later outputted by the printing device.

4. An image forming device as claimed in claim 1 wherein the printing device includes a page printer.

5. An image forming device comprising:
   an image transmission device for transmitting image data to and from the image forming device and a remote device over a telephone circuit;
   a data transmission device for transmitting computer data to and from the image forming device and a computer over a transmission circuit;
   conversion means for converting the image data to print data;
   a memory for storing the image data, the computer data, and the print data;
   a printing device for printing based on the image data and the computer data stored in the memory;
   mode setting means for setting a first mode wherein the image transmission device receives the image data from a transmission and stores the image data and the print data converted by the conversion means into the memory while the printing device is printing based on the computer data;
   monitor means for determining whether the printing device can be used to print, the monitor means operating during the first mode based on the image data;
   mode switching means for remaining in the first mode when the monitor means determines that the printing device is unavailable before a predetermined duration of time has elapsed and for switching, when the monitor means determines that the printing device is unavailable after the predetermined duration of time has elapsed, to a second mode wherein the image transmission means stores the image data from the transmission into the memory and wherein conversion means does not convert the image data from the transmission into the print data; and
   printing control means for outputting the image data stored in the memory to the printing device when the monitor means determines that the printing device is available during the first mode and for, when reception of the image data from the transmission has been completed during the second mode, causing the conversion means to convert the image data stored in the memory from the transmission into the print data and outputting the print data to the printing device.

6. An image forming device as claimed in claim 5 further comprising erasure means for, after the print data has been outputted to the printing device, erasing from the memory the print data corresponding to the print data outputted to the printing device.

7. An image forming device as claimed in claim 5 further comprising erasure means for, after the print data has been outputted to the printing device, erasing from the memory the image data corresponding to the image data of the transmission converted to the print data and outputted to the printing device.

8. An image forming device as claimed in claim 5 further comprising erasure means for, after the print data has been outputted to the printing device, erasing from the memory the image data and the print data corresponding to the image data of the transmission converted to the print data and outputted by the printing control means.

9. An image forming device as claimed in claim 5 further comprising priority setting means for giving priority to printing of the computer data so that the print control means remains available for printing based on the computer data without printing based on the image data regardless of whether the monitor determines that the printing device is available.

10. An image forming device comprising:

reception means for receiving image data from a remote device over a transmission circuit;

a memory for storing the received image data;

a printing device for printing based on the image data stored in the memory;

determination means for determining whether or not the printing device is printing other image data when the image data is received;

time counting means for counting time from when the determination means determines that the printing device is printing the other image data; and print control means for, when the determination means determines that the printing device has completed printing the other image data before the time counting means reaches a predetermined time count, outputting to the printing device the received image data stored in the memory and for, when the determination means determines that the printing device is printing the other image data once the time counting means reaches the predetermined time count, outputting the received image data stored in the memory to the printing device after the reception means completes reception of all image data from the remote device.

11. An image forming device as claimed in claim 10 further comprising a conversion means for converting the image data received in encoded form by the reception means into decoded print data, which is then stored in the memory.

12. An image forming device as claimed in claim 11 wherein the print data converted by the conversion means is stored in the memory.

13. An image forming device as claimed in claim 12 further comprising erasure means for erasing the print data from the memory after the image data has been outputted to the printing device.

14. An image forming device as claimed in claim 12 further comprising erasure means for erasing the image data and the print data from the memory after the image data has been outputted to the printing device.

15. An image forming device as claimed in claim 10 further comprising erasure means for erasing the image data from the memory after the image data has been outputted to the printing device.

16. An image forming device as claimed in claim 10 wherein the printing device includes a page printer.

* * * * *